is) United States Patent
McCaherty

(10) Patent No.: US 8,311,844 B2
(45) Date of Patent: Nov. 13, 2012

(54) METHOD AND SYSTEM FOR ANALYZING PAYLOAD INFORMATION

(75) Inventor: James W. McCaherty, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 2129 days.

(21) Appl. No.: 10/054,952

(22) Filed: Jan. 25, 2002

(65) Prior Publication Data

US 2002/0161502 A1 Oct. 31, 2002

Related U.S. Application Data

(60) Provisional application No. 60/286,039, filed on Apr. 25, 2001.

(51) Int. Cl.
*G06Q 10/00* (2012.01)
(52) U.S. Cl. .................. 705/1.1; 705/7.36
(58) Field of Classification Search .............. None
See application file for complete search history.

(56) References Cited

U.S. PATENT DOCUMENTS

| 4,588,038 A * | 5/1986 | Takagi ................... 177/141 |
| 4,605,081 A * | 8/1986 | Helmly et al. ............ 177/25.13 |
| 4,921,578 A | 5/1990 | Shiraishi et al. |
| 5,182,712 A | 1/1993 | Kyrtsos et al. |
| 5,416,706 A | 5/1995 | Hagenbuch |
| 5,650,928 A * | 7/1997 | Hagenbuch ................. 701/1 |
| 7,136,787 B2 * | 11/2006 | Schlessinger et al. ......... 703/2 |
| 7,406,436 B1 * | 7/2008 | Reisman ................. 705/7.32 |

FOREIGN PATENT DOCUMENTS

WO WO 96/16383 5/1996

OTHER PUBLICATIONS

Forest Service, "Forest Service Handbook Washington", Dec. 30, 1992, http://www.fs.fed.us/im/directives/fsh/7109.19/7109.19,30.txt.*

* cited by examiner

*Primary Examiner* — Dennis Ruhl
*Assistant Examiner* — Paul R Fisher
(74) *Attorney, Agent, or Firm* — Finnegan, Henderson, Farabow, Garrett & Dunner LLP

(57) ABSTRACT

A method is provided for analyzing compliance of one or more pieces of equipment with a payload standard. A target payload for the one or more pieces of equipment is determined. Payload weight data is obtained for the one or more pieces of equipment. The payload weight data is then compared with the target payload, and compliance with the payload standard is analyzed based on the results of the comparison.

31 Claims, 11 Drawing Sheets

| PAYLOAD MANAGEMENT ANALYZER |
|---|
| BACKGROUND INFORMATION (* INDICATES UNITS REQUIRED) |

| | |
|---:|---|
| MINE/PROJECT: | |
| LOCATION: | |
| TEST DATE (S): | |
| DATA RECORDED BY: | |
| ANALYSIS DATE: | |
| ANALYSIS PERFORMED BY: | |
| TRUCK FLEET: | |
| | (LIST MODEL & SERIAL NUMBER RANGE) |
| BODY DESIGN: COMMENTS:>>> | ☐ STANDARD ☐ LIGHT WEIGHT ☐ ULTRA-LIGHT WEIGHT ☐ OTHER (EXPLAIN BELOW) |
| | |
| *BODY CAPACITY: | |

BODY CONFIGURATION:
   SIDEBOARDS: ☐ YES (IF "YES", HEIGHT >>>
   DUCKTAILS: ☐ YES
   LINERS: ☐ YES (IF "YES", EXPLAIN >>>
   END GATE: ☐ YES
   BODY HEAT: ☐ YES (DETAIL LINER PACKAGE; CANOPY, FRONT WALL, SIDE WALLS, FLOOR, TRANSITION AREA, TUMBLE BARS)

MACHINE CONFIGURATION:
   HIGH CAPACITY FUEL TANK: ☐ YES; CAPACITY
   EXTENDED FRONT BUMPER ☐ YES; WEIGHT
   TIRES: (LIST SUPPLIER & SPECS)>>>>>>
   PAYLOAD DISPLAY "SCOREBOARD": ☐ YES
   OTHER SIGNIFICANT "ADD ONS":>>>>>>>>

| | |
|---:|---|
| EMPTY MACHINE WEIGHT DETERMINED BY: | ☐ ESTIMATED e.g. PERFORMANCE HANDBOOK ☐ SPEC SHEET DATA ☐ SCALE WEIGHTS |
| *VIMS/TPMS TARGET PAYLOAD: | |
| PAYLOAD DATA OBTAINED FROM: | ☐ TPMS     ☐ VIMS TPMS     ☐ SCALE WEIGHTS |
| LOADING TOOL(S): | |
| *BUCKET CAPACITY/PASS MATCH: | |

*FIG. 4*

| PAYLOAD MANAGEMENT ANALYZER | |
|---|---|
| DETERMINE EMPTY MACHINE WEIGHT | |

EMPTY MACHINE WEIGHTS HERE>>>
(ENTER DATA IN US OR METRIC TONS; BE CONSISTENT!)
(CAPACITY: MINIMUM 2 AND UP TO 100 SAMPLES)

| | |
|---|---|
| 15.20 | |
| 15.60 | |
| 15.45 | |
| 16.02 | |
| 15.90 | |
| 15.87 | |
| 15.40 | |

STATISTICAL RESULTS
NUMBER OF SAMPLES = 7
MINIMUM VALUE = 15.20
MAXIMUM VALUE = 16.02
MEDIAN VALUE = 15.60
MEAN = 15.63
STANDARD DEVIATION = 0.281214567
95% CONFIDENCE LIMIT = 0.20832253

[ CALCULATE EMW ]

[ US TONS ]

[ METRIC TONS ]

[ RESET PAYLOAD ]

NOTE: IF EMPTY WEIGHT IS ESTIMATED, SIMPLY ENTER ESTIMATED EMW IN SPACE HIGHLIGHTED BESIDE "MEAN" IN THE STATISTICAL RESULTS AREA OF THIS SHEET.

*FIG. 5*

PAYLOAD MANAGEMENT ANALYZER

DETERMINE TARGET PAYLOAD WEIGHT

TRUCK MODEL NUMBER?   | 769 US | 769 METRIC |
                      | 773 US | 773 METRIC |
                      | 777 US | 777 METRIC |
                      | 785 US | 785 METRIC |
                      | 789 US | 789 METRIC |
                      | 793 US | 793 METRIC |
                      | 793 + US | 793 + METRIC |
                      | 797 US | 797 METRIC |

US OR METRIC UNITS?

MAXIMUM GROSS MACHINE WEIGHT = 177.50

EMPTY MACHINE WEIGHT = 15.63

TARGET PAYLOAD WEIGHT = 161.87          0.00

[CALCULATE TARGET PAYLOAD]

[RESET TARGET PAYLOAD]

*FIG. 6*

PAYLOAD MANAGEMENT ANALYZER
ANALYZE PAYLOAD WEIGHT DATA

| | | STATISTICAL RESULTS | |
|---|---|---|---|
| PAYLOAD WEIGHT DATA HERE>>> | 176.50 | | |
| (ENTER DATA IN US OR METRIC TONS; BE CONSISTENT!) | 186.60 | NUMBER OF SAMPLES = | 17 |
| (CAPACITY: MINIMUM 2 AND UP TO 20,000 SAMPLES) | 169.90 | MINIMUM VALUE = | 159.80 |
| | 172.30 | MAXIMUM VALUE = | 190.30 |
| | 168.50 | MEDIAN VALUE = | 176.50 |
| | 183.50 | MEAN = | 175.87 |
| | 169.50 | STANDARD DEVIATION = | 8.725804233 |
| | 179.40 | 95% CONFIDENCE LIMIT = | 4.14790167 |
| | 182.20 | | |
| | 169.80 | | |
| | 159.80 | | |
| | 179.56 | | |
| | 190.30 | | |
| | 189.70 | | |
| | 177.60 | | |
| | 173.20 | | |
| | 161.50 | | |

CALCULATE PAYLOAD

RESET PAYLOAD

FIG. 7

| PAYLOAD MANAGEMENT ANALYZER ||||
|---|---|---|---|
| APPLY "10-10-20" PAYLOAD RATING CRITERIA ||||
| | | US TONS | METRIC TONS |
| TARGET PAYLOAD WEIGHT = | | 161.87 | |
| 110% TARGET PAYLOAD WEIGHT = | | 178.06 | |
| MAXIMUM PAYLOAD WEIGHT = | | 194.24 | |
| MEAN = | | 175.87 | |
| STANDARD DEVIATION = | | 8.725804233 | |
| < TARGET PAYLOAD = | | 5.43% | |
| > TARGET PAYLOAD = | | 94.57% | |
| < 110% TARGET PAYLOAD = | | 59.88% | |
| > TARGET PAYLOAD < 110% TARGET PAYLOAD = | | 54.45% | |
| < MAXIMUM PAYLOAD = | | 98.24% | |
| > 110% TARGET PAYLOAD < MAXIMUM PAYLOAD = | | 38.36% | |
| > MAXIMUM PAYLOAD = | | 1.76% | |
| PAYLOAD RATING = | | 10 | (% OF PAYLOADS LESS THAN 110% TARGET) |
| PAYLOAD RATING = | | 5 | (% OF PAYLOADS GREATER MAXIMUM) |

RATING 1: ☑ 100% OF LOADS LESS THAN 110% OF TARGET PAYLOAD/NO LOADS GREATER THAN MAXIMUM.
RATING 2: ☑ 95% OF LOADS LESS THAN 110% OF TARGET/0.1% OF LOADS GREATER THAN MAXIMUM.
RATING 3: ☑ 90% OF LOADS LESS THAN 110% OF TARGET/0.5% OF LOADS GREATER THAN MAXIMUM.
RATING 4: ☒ 85% OF LOADS LESS THAN 110% OF TARGET/1% OF LOADS GREATER THAN MAXIMUM.
RATING 5: ☒ 80% OF LOADS LESS THAN 110% OF TARGET/2% OF LOADS GREATER THAN MAXIMUM.
RATING 6: ☒ 75% OF LOADS LESS THAN 110% OF TARGET/5% OF LOADS GREATER THAN MAXIMUM.
RATING 7: ☒ 70% OF LOADS LESS THAN 110% OF TARGET/10% OF LOADS GREATER THAN MAXIMUM.
RATING 8: ☒ 65% OF LOADS LESS THAN 110% OF TARGET/15% OF LOADS GREATER THAN MAXIMUM.
RATING 9: ☒ 60% OF LOADS LESS THAN 110% OF TARGET/20% OF LOADS GREATER THAN MAXIMUM.
RATING 10: ☒ 55% OF LOADS LESS THAN 110% OF TARGET/25% OF LOADS GREATER THAN MAXIMUM.

*FIG. 8*

PAYLOAD MANAGEMENT ANALYZER
CALCULATE TPMS TARGET PAYLOAD WEIGHT

| | US TONS | METRIC TONS |
|---|---|---|
| TPMS TARGET PAYLOAD WEIGHT = | 168.07 | |

USE THE VALUE ABOVE AS THE TARGET PAYLOAD FOR TPMS.

FIG. 9

METHOD AND SYSTEM FOR ANALYZING PAYLOAD INFORMATION

CROSS REFERENCE TO RELATED APPLICATIONS

This application claims the benefit of U.S. Provisional Application No. 60/286,039, filed Apr. 25, 2001, the contents of which are hereby incorporated by reference.

TECHNICAL FIELD

The present invention relates generally to standards for equipment operation and maintenance, and more particularly, to a method and system for analyzing payload information to determine and promote compliance with desired payload standards.

BACKGROUND

A number of industries, such as the mining industry, rely on large off-highway trucks to transport large cargo loads. Not only are the loads themselves extensive, but these trucks are frequently operated around the clock. Manufacturers or dealers of these off-highway trucks typically provide a warranty for the truck, often covering the entire life of the vehicle. Because this type of warranty may be costly to the manufacturer, the manufacturer often specifies operating and maintenance standards, such as maximum operating weights, in order to achieve a longer operating life of the vehicle.

Sometimes the specified maximum operating weight is viewed as the target weight, rather than a weight that should not be exceeded, as there may be divergent interests in this area. Hauling a heavier load may result in a greater profit for the operation, at least in the short term. But, frequent overloading will adversely affect equipment life and operation. Overloading may also result in reduced fuel efficiency and increased operating costs. Additionally, overloading may increase wear on components and may break structural joints. Some studies have shown that every one ton increase in mean payload (or cargo weight) above target decreases component life by approximately 1%. Further, repeated overloads may potentially decertify brake and/or steering systems in the equipment.

As noted above, this equipment is typically under a manufacturer's warranty. Component or structural breakdown, as well as reduced operating efficiency, will lead the customer back to the manufacturer. It may be difficult for the manufacturer, however, to determine whether the failure is due to equipment flaws or to equipment overload.

To balance the interest in hauling at maximum potential with the interest in maximizing equipment life, equipment owners often request manufacturers to provide an "acceptable" overload amount (or percentage above the target, or acceptable, payload), wherein the adverse effects to the equipment are minimized while still permitting the hauling of large loads.

Currently, systems exist that determine and store the payload weights of a vehicle. One such system is shown in U.S. Pat. No. 5,182,712 entitled "Dynamic Payload Monitor". This system includes an on-board processor that stores a set of payload weights and may calculate the average payload and overload percentage. While this invention accurately depicts payload and overload information, further calculations may be required to truly appreciate the actual operation of the vehicle. For example, two sets of payload weights may give the same average payload. This average payload will not indicate whether there are some trips with very high weights and some trips with very low weights, versus whether a majority of trips occurred at or near the average weight. Further, the currently available systems do not provide the owner with sufficient information to alter his behavior in order to obtain and/or continue compliance.

The present invention is directed to overcoming one or more of the problems or disadvantages associated with the prior art.

SUMMARY OF THE INVENTION

A method is provided for analyzing compliance of one or more pieces of equipment with a payload standard. A target payload for the one or more pieces of equipment of a particular equipment type is determined. Payload weight data is obtained for the one or more pieces of equipment. The payload weight data is then compared with the target payload and compliance with the payload standard is analyzed based on the results of the comparison.

Further, a computer-readable medium, including instructions for performing a method, when executed by a processor, is provided for analyzing compliance of one or more pieces of equipment with a payload standard. The instructions included with the computer-readable medium include the following steps. A target payload for the one or more pieces of equipment of a particular equipment type is determined. Payload weight data is obtained for the one or more pieces of equipment. The payload weight data is then compared with the target payload and compliance with the payload standard is analyzed based on the results of the comparison.

A system is also provided for analyzing compliance of one or more pieces of equipment with a payload standard. An input module receives data about the one or more pieces of equipment. Connected to the input module, a processing module analyzes the data based on the payload standard. An output module, connected to the processing module, provides the analysis results.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 4 is an exemplary interface for entering equipment identification information, consistent with the present invention.

FIG. 5 is an exemplary interface for entering empty machine weights, consistent with the present invention.

FIG. 6 is an exemplary interface for determining target payload weight, consistent with the present invention.

FIG. 7 is an exemplary interface for analyzing payload weight data, consistent with the present invention.

FIG. 8 is an exemplary interface for rating the results of payload weight analysis, consistent with the present invention.

FIG. 9 is an exemplary interface for calculating a modified target payload weight, consistent with the present invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

In accordance with the present invention, a system and method are provided to analyze payload weight data from one or more pieces of equipment to determine compliance with a payload standard. For example, an equipment manufacturer, dealer, or owner may determine that it is acceptable for a particular piece of equipment to be overloaded by a certain percentage, so long as the fraction of time that the vehicle is overloaded remains below another threshold value. Specifically, one exemplary protocol may be a 10/10/20 standard. In this example, it is permissible for a piece of equipment to carry a 10% overweight payload (or 1.1 times the target payload) on 10% of its trips. However, no single payload should exceed the maximum target payload by 20% (or exceed 1.2 times the target payload). Other protocols may be based on regulatory standards or based on contracts between the manufacturer or dealer and the customer, or desired thresholds established by the manufacturer, dealer, and/or owner.

The payload standard may be established by anyone having an interest in equipment performance or equipment operating life, such as a manufacturer, dealer, industry organization, regulatory agency, or owner. Equipment subject to such payload standards may include off-highway trucks, on-highway or over-the-road trucks, tractors, trailers, or combinations thereof, railroad cars, any other vehicle or machine that transports loads of potentially variable weights, and/or any other type of payload carrying equipment. Payload weight data analysis may consider multiple payload weights obtained from one piece of equipment, multiple payload weights obtained from multiple pieces of equipment (such as a fleet), or multiple payload weights obtained from a representative group of pieces of equipment from a fleet, where the results are to be applied to the fleet as a whole. Payload weights are most representative when monitored over a period of time; however, it is also possible to use the features of the present invention to analyze single payload weights obtained from one or more pieces of equipment. The results of the payload weight data analysis may be used, for example, by an owner, manufacturer, or dealer to compare actual loading practices to preferred loading practices for warranty analysis or machine operating life studies or to determine maintenance scheduling. For example, an equipment owner may use the results of payload weight data analysis for its own purpose, such as ensuring compliance with warranty guidelines or minimizing the maintenance required to maintain a fleet of equipment in working order.

Figure 1:
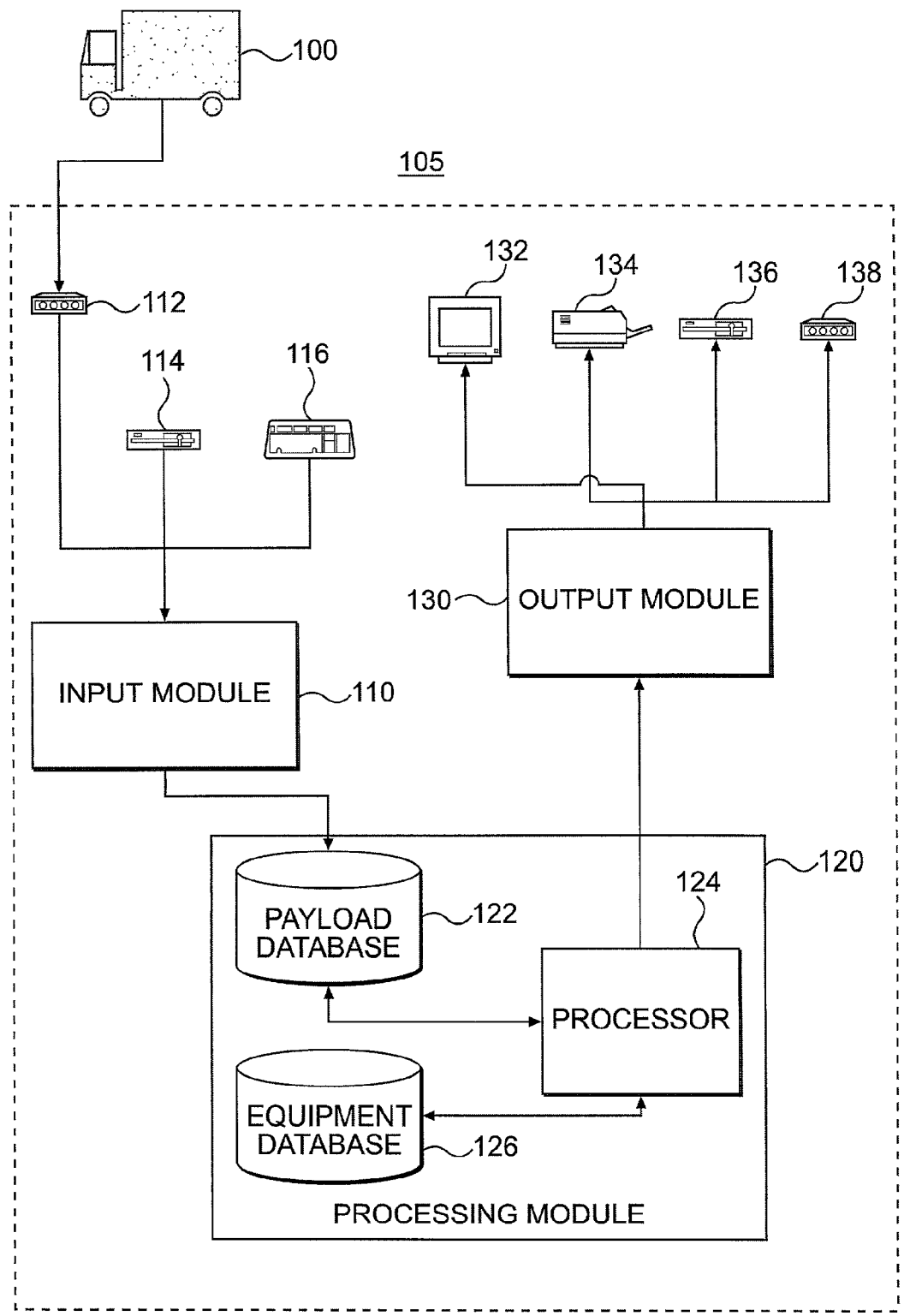
FIG. 1 is a block diagram of an exemplary payload analysis system consistent with the present invention.

FIG. 1 illustrates a system consistent with the present invention. As shown in FIG. 1, equipment 100 interacts with payload analysis system 105. System 105 includes an input module 110 for obtaining data from equipment 100, an processing module 120, and an output module 130 for providing results of the analysis. Processing module 120 receives data from input module 110, analyzes this data, and provides the results to output module 130 for display.

Equipment 100 may include an off-highway truck, an on-highway truck, a tractor, a trailer, or combination thereof, or any other piece of equipment that transports loads. Further, equipment 100 may be a single piece of equipment, a member of a fleet of pieces of equipment where payload analysis is performed for the entire fleet, or may be a member of a representative sample of a fleet of equipment where payload analysis is performed for the sample, but applied to the whole fleet. Equipment 100 may include information about one or more payload weights for a given piece of equipment.

In one embodiment, payload weights may be collected by an on-board payload sensing system associated with equipment 100. The payload sensing system, for example, may include an on-board processor connected to pressure transducers in the equipment's suspension cylinders or shock absorbers. The pressure transducers sense the change in pressure in the cylinders as the equipment is loaded with cargo. The processor then converts the pressure information to payload weight and stores the payload weight data, for example, in a database in the on-board processor.

In an alternative embodiment, payload weight data may be collected from an external scale, such as found at a loading area. A payload weight, associated with the equipment, is then recorded or stored by the scale. Alternatively, the payload weights collected from the scale may be stored in a database at a central data facility (not shown) or any other database or record.

Input module 110 receives payload weight data associated with equipment 100. In one embodiment, input module 110 is connected via network connection 112 to equipment 100. In this embodiment, a user may download the stored payload weight data from a payload sensing system, for example, during a routine maintenance visit, using network connection 112 between equipment 100 and input module 110. In another embodiment, input module 110 is connected via network connection 112 to the scale or to the database storing weights collected by the scale. Again, the user may download the payload weight data over network connection 112 to input module 110. In either of the above embodiments, network connection 112 may include a wire connection or a wireless connection. Alternatively, where network connection 112 is a wireless connection and a payload sensing system is used, the payload weight data may be sent to system 105 each time the equipment is loaded, rather than being stored by the payload sensing system. The data sent would then be stored by system 105.

In yet another embodiment, payload weight data about equipment 100 may be measured by a scale or other system, collected, and stored or recorded either manually or through another method for storing data. In this embodiment, the collected data may be provided to input module 110 via a device for accessing stored data 114, such as a disk drive, CD-ROM, or optical drive. Alternatively, a user may enter the collected data manually via a data input device 116, such as keyboard.

In addition to payload weight data from equipment 100, a user may provide empty machine weight information and/or equipment identification information to input module 110, via a network connection 112, a device for accessing stored data 114, or a data input device 116. Empty machine weight information may be obtained through similar methods as used to obtain payload weight data, namely, actual weight information obtained from a payload sensing system in the equipment or from an external scale. Alternatively, a user may enter an estimated empty machine weight from a manufacturer's specification sheet (or other source) for the equipment type and based on the configuration of the equipment.

In one embodiment, equipment identification information may be used to assist the user in identifying pieces of equipment when tracking the payload trends of a piece of equipment, fleet of pieces of equipment, or portions thereof, identifying circumstances surrounding particular payload weight data, and identifying configurations of the piece of equipment or fleet of equipment for future reference. Equipment identification information may be determined and entered by the user. Equipment identification information, for example, may include an identification number for the equipment, the location of the equipment, how the payload weight data was recorded (and if manually, the operator who recorded the payload weight data), the date of analysis, the user performing the analysis, the type of equipment, any special equipment configurations, the source of the payload weight data, or any additional desired identification information.

Input module 110 provides the payload weight data, the empty machine weight information, and the equipment identification information, if used, to processing module 120. Processing module 120 includes payload weight database 122, processor 124, and equipment database 126. Payload weight database 122 stores payload weight data and empty machine weight information received from input module 110. Processor 124 accesses the payload weight data in payload weight database 122. Processor 124 also accesses equipment database 126, which includes static information for each equipment type, such as maximum gross equipment weight and payload standard information. Equipment database 126 may include traditional storage media, such as a database, or specialized storage media, such as look-up tables.

Processor 124 determines a target payload value based on the empty machine weight stored in payload weight database 122 and the maximum gross equipment weight stored in equipment database 126. Based on the target payload value, processor 124 analyzes the payload weight data stored in payload weight database 122 to determine how well the equipment complied with the payload standard. Further, processor 124 may determine a distribution of payload weight data, a rating based on equipment compliance with the payload standard, and a modified target payload based on previous compliance with the payload standard. Processor 124 then provides the results of the analysis to output module 130.

Output module 130 presents the results, distribution, rating, and/or modified target payload to the user. Output module 130 may provide this data in textual and/or graphical format, and may provide the data to a display 132, such as a monitor or screen; to a hardcopy device 134, such as a printer or facsimile machine; to a stored data device 136, such as a disk drive, CD ROM, or optical drive; or may send the data over a network device 138 to another system, processor, or user.

System 105 may be implemented in various environments to provide the tools for obtaining the required data, analyzing the data, and providing the results of that analysis. System 105 may be hardware specifically constructed for performing various processes and operations of the invention or may include a general purpose computer or computing platform selectively activated or reconfigured by program code to provide the necessary functionality. System 105 may exist at a location separate from equipment 100, such as a central data facility. Alternatively, system 105 may be provided as an on-board system on equipment 100. In this case, input module 110 may obtain the payload weight data directly from the payload sensing system of equipment 100. As an on-board tool, system 105 may provide real-time warnings to the operator of the equipment regarding compliance with the payload standard. As a further alternative to this embodiment, using wireless network connection 112, periodically updated analysis results may be sent to a central data facility for record keeping and compliance-assurance. In addition, functions of the input module 110, processing module 120, and output module 130 may be combined.

Figure 2A:
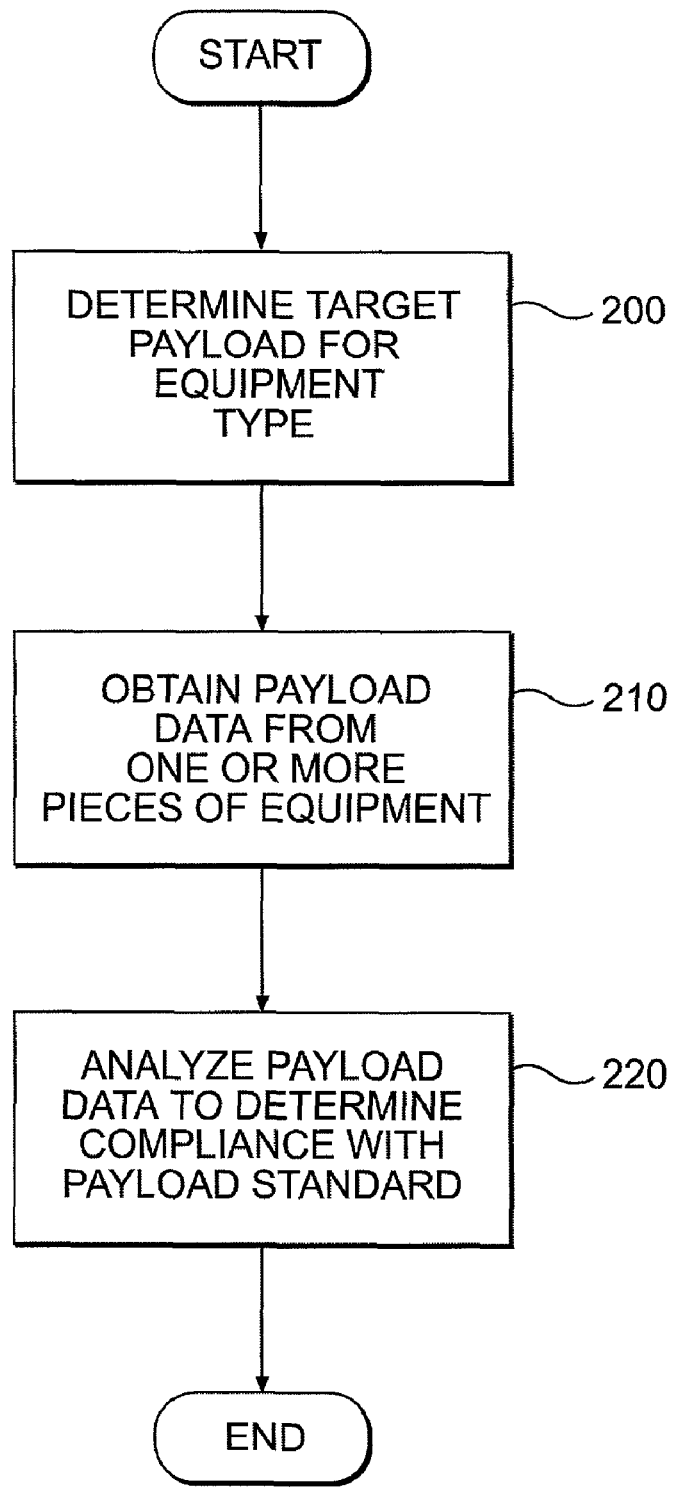
FIG. 2A is an exemplary flow chart of one embodiment of a method, consistent with the present invention, for analyzing payload weight data.

FIG. 2A illustrates an exemplary flow chart of a method for analyzing payload weight data, consistent with the present invention. First, a target payload is determined based on the equipment type (step 200). The target payload is the specified allowable payload, and may depend on the model of equipment as well as the configuration of the equipment, including, for example, the fuel tank capacity of the equipment or the dump body design. One exemplary method for determining the target payload is to subtract an empty machine weight (EMW) from the maximum gross machine weight (MGMW) for the equipment, for example. Processor 124 accesses the MGMW for the equipment type from equipment database 126. Processor 124 then subtracts the EMW, received from input module 110, from the MGMW, to determine the target payload. Determination of the EMW itself is described in further detail below, with reference to FIG. 3.

Alternatively, the target payload may be based, at least in part, on one or more external characteristic or configuration of the equipment. For example, the standard target payload may be altered to reflect the fact that the equipment operates on sloped terrain or carries a particular type of load. The target payload may also be based on a contract between the manufacturer and the owner. In these cases, where the target payload is determined via alternative methods, the compliance of a piece of equipment with the payload standard may be performed for both the typical target payload weight or standard, e.g., a first standard, and for the alternative or contractual payload weight or standard, e.g., a second standard.

Next, payload weight data is obtained from one or more pieces of equipment (step 210). As described above, there are numerous ways for payload weight data to be collected from equipment 100, transferred to input module 110, and sent to payload database 122. For example, a payload sensing system in equipment 100 may collect the payload weight data and send it, via network connection 112, to input module 110. Input module 110 forwards the payload weight data to payload database 122. Payload weight data may be expressed in metric tons, U.S. tons, or any other appropriate weight unit. In one embodiment, only one unit is used for each set of data analyzed. Payload weight data may include multiple payload weights from a single piece of equipment, where each payload weight represents a different load hauled. Alternatively, payload weight data may include one or more payload weights from each of a plurality of pieces of equipment, such as a fleet. In yet another alternative, payload weight data may include one or more payload weights from a representative sample of pieces of equipment from a fleet, wherein the results of the analysis on the payload weight data for the sample will apply to an entire fleet. Because the analysis depends on the equipment type and configuration, embodiments analyzing weights from multiple pieces of equipment preferably ensure that each piece of equipment included is of a similar type and configuration.

In another embodiment, analysis of the payload weight data for a fleet of differently configured pieces of equipment may be performed. In this embodiment, the analysis may be based on a relative target payload.

Finally, the payload weight data is analyzed with reference to a payload standard, to determine the level of compliance with the standard (step 220). Depending on the payload standard, a number of statistical calculations may be performed on the payload weights. This step is described in further detail with reference to FIG. 2B, which illustrates an exemplary analysis done in accordance with one embodiment of the present invention.

Figure 2B:
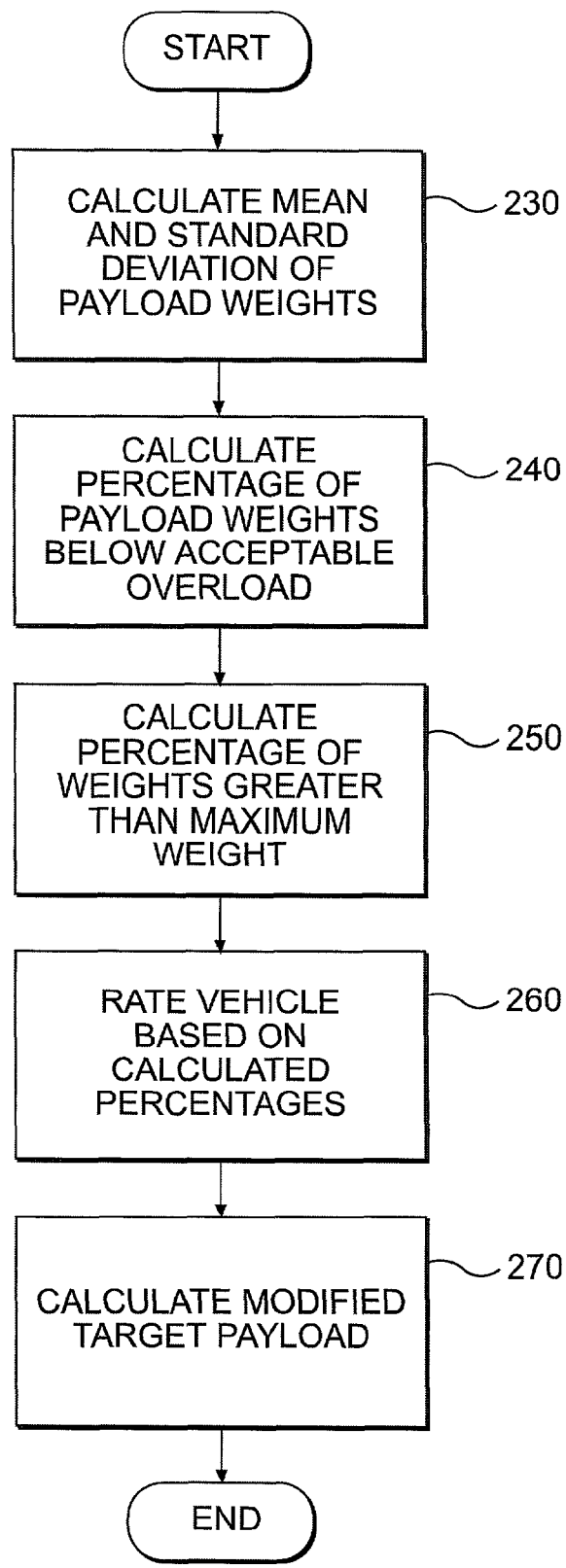
FIG. 2B is an exemplary flow chart illustrating one embodiment of a method, consistent with the present invention, for performing statistical analysis on the payload data and comparing the analysis results to a payload standard.

As shown in FIG. 2B, the arithmetic mean (or average) of the payload weights may be calculated, as is the standard deviation (step 230). Next, the percentage of payload weights falling below an acceptable overload is calculated (step 240). The acceptable overload may be expressed as a percentage or fraction of the target payload (determined in step 200). For example, an acceptable overload may be 10% over target payload (or 1.1 times the target payload). The payload weight data is then compared to this acceptable overload weight, and the percentage of payload weights falling below that value is calculated.

The percentage of payloads greater than a maximum acceptable weight is then determined (step 250). Similarly, the maximum acceptable weight may be expressed as a percentage or fraction of the target payload. For example, maximum acceptable overload may be 20% over target payload (or 1.2 times the target payload). The payload weight data is then compared to the maximum acceptable weight and the percentage of payload weights falling above that value is calculated. Further, the maximum acceptable weight may be compared to the maximum gross machine weight, determined in step 200. If the maximum gross machine weight is less than the maximum acceptable weight, the maximum gross machine weight is preferably substituted for the maximum acceptable weight to determine the percentage of payloads greater than the maximum gross weight.

Additional percentages may also be calculated, depending on the payload weight standard that is being considered. For example, it may be relevant to calculate the percentage of payload weights falling above or below the target payload, the percentage of payload weights falling between the target payload and the acceptable overload weight, or the percentage of payload weights falling between the acceptable overload weight and the maximum acceptable weight. Other calculations are also possible.

Following calculation of the relevant percentages, the equipment may be rated based on the calculations and the payload weight standard (step 260). For example, the compliance rating may be a simple indication of compliance. If the relevant payload standard was the 10/10/20 standard, as described above, this rating would be as follows. So long as the equipment had less than 10% of its payload weights above the acceptable overload weight (or 10% over) and none of its payload weights at greater than the maximum overload weight (20% over), then the equipment rates "compliant"—otherwise, the equipment is "non-compliant." Additional rating schemes are also possible. For example, a graded rating scale may be used, wherein the equipment is assigned a numeric or other rating based on the percentages calculated in steps 240 and 250 or based on comparison of the payload weight data with the payload standard. One such graded rating scale is shown in FIG. 8. In this particular rating system, a piece of equipment may receive a rating of "1" if 100% of its payloads are less than the acceptable overload weight and no loads are greater than the maximum acceptable weight. A piece of equipment may receive a rating of "5", however, if only 80% of its payloads are less than the acceptable overload weight and 1% of the loads are greater than the maximum acceptable weight. The specifics of the rating scale may vary depending upon the application and can be adjusted as necessary to provide useful compliance information in a summary form.

In one embodiment, a modified target payload may be calculated (step 270). This modified target payload takes into account the prior payloads of the piece of equipment and determines a target payload, which if followed, would ensure compliance with the payload weight standard. One possible formula for calculating the target payload is to calculate a figure that is three standard deviations less than the maximum acceptable weight. For example, a given truck has a target payload weight of 160 and a maximum acceptable weight of 195. In step 230, it is determined that, for a given set of payload data, the standard deviation is 8. A modified target payload may be calculated by subtracting three times the standard deviation from the maximum acceptable weight, or in this example, the modified target payload is 195−3(8), or 171.

Figure 3:
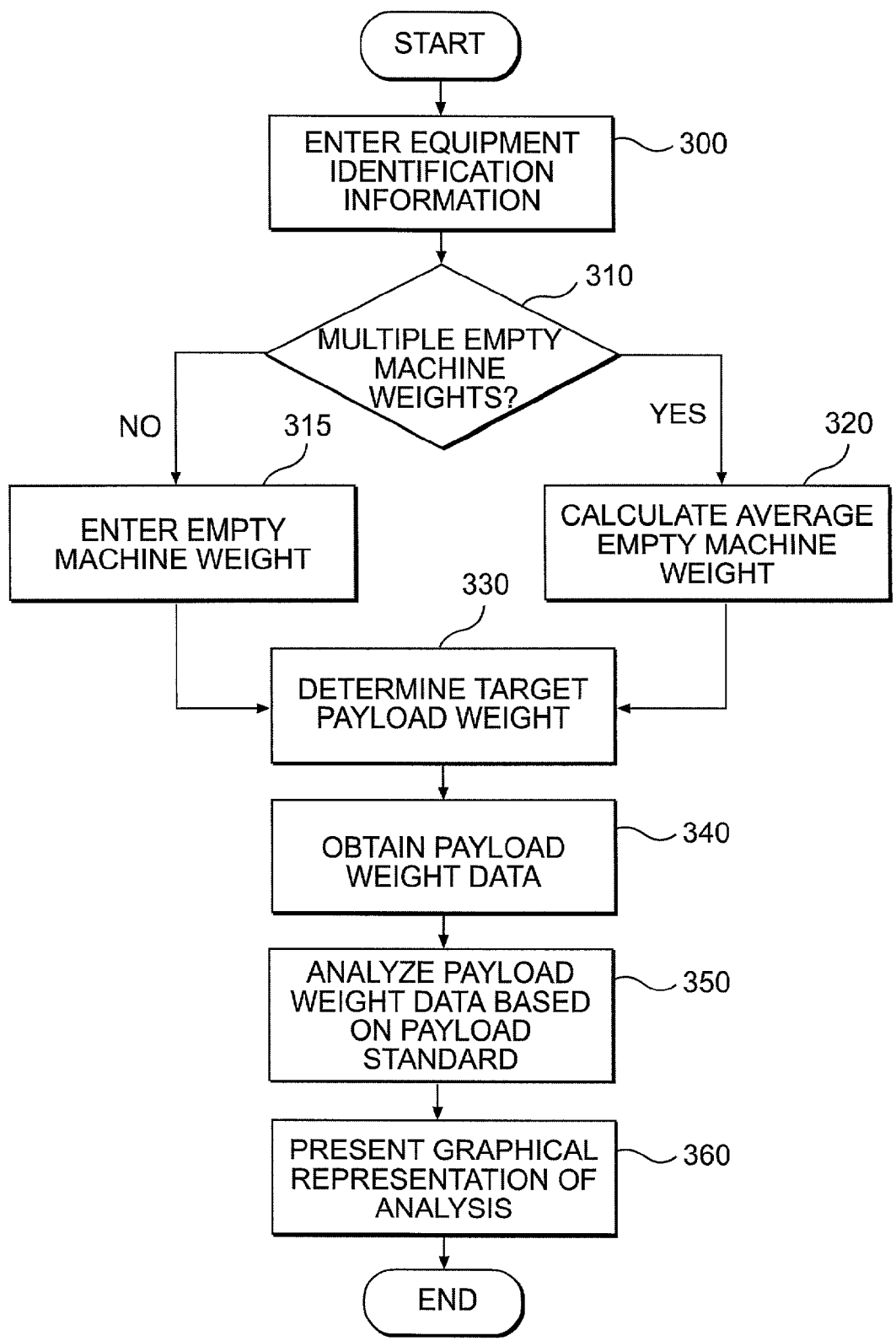
FIG. 3 is an exemplary flow chart of a second embodiment of a method, consistent with the present invention, for analyzing payload weight data.

FIG. 3 illustrates an alternate embodiment of a method for analyzing payload weights based on a payload weight standard, consistent with the present invention. Similar to the method described with respect to FIG. 2, this alternative embodiment adds additional features to the present invention.

First, the user enters equipment identification information into the system (step 300). This equipment identification information may include a equipment identification number, the location of the equipment, how and by whom the payload weight was recorded and stored, the date of analysis, the user performing the analysis, the configuration of the piece(s) of equipment, and other information that a user may find helpful to identify either the equipment at issue or the circumstances surrounding the analysis. An exemplary user interface for entering such data is shown in FIG. 4.

Next, the user determines if there are multiple empty machine weights (step 310). As noted above, empty machine weights may be obtained either from payload sensing systems on-board the equipment or from an external source, such as a scale. Additionally, empty machine weights may be estimated from a performance handbook or provided by a manufacturer's specification sheet. If only one empty machine weight has been obtained from the payload sensing system or a scale, the user enters the single empty machine weight (step 315). Alternatively, if the empty machine weight has been estimated from a specification sheet, the user would enter the single empty machine weight. If, instead, there are two or more empty machine weights, the system may calculate an average empty machine weight based on the two or more empty machine weights (step 320). An exemplary interface for entering either a single empty machine weight or multiple empty machine weights is shown in FIG. 5.

Empty machine weights may either be entered manually via an input device 116, or obtained over a network connection 112, or from a device for accessing stored data 114. After the empty machine weights are entered, as shown in FIG. 5, a user may click the "Calculate EMW" button to prompt the system to calculate the average empty machine weight. If a single empty machine weight is to be used, the user may simply enter that figure in the box following "Mean=". As shown on FIG. 5, the user may also select whether to use U.S. or metric tons for the calculations. Regardless of the unit of measurement selected, the weight data throughout should consistently use the chosen unit.

Regardless of how the empty machine weight is determined, the next step is to determine target payload weight (step 330). Target payload weight is dependent on the type of equipment and the configuration of the equipment. As noted above, one method for determining the target payload is to subtract the empty machine weight (EMW), determined in either step 315 or 320, from the maximum gross machine weight (MGMW), from equipment database 126, for the equipment. An exemplary interface for entering equipment information to obtain a target payload weight is shown in FIG. 6. For example, as shown in FIG. 6, the data for each machine may be contained in the system. The user may select which model of equipment is at issue, and the MGW for that piece of equipment would be filled in at the appropriate location on the screen. Further, the system may automatically subtract the EMW, as determined in step 320, from the MGW.

Payload weight data is then obtained (step 340). As described above, there are numerous ways for payload weight data to be collected from equipment 100, transferred to input module 110, and sent to payload database 122. Payload weight data may contain payload weights from one or more pieces of equipment. Only one unit, for example, either U.S. tons or metric tons, should be used for each set of data analyzed. Because the analysis depends on the equipment type and configuration, however, weights from multiple pieces of equipment preferably ensure that each piece of equipment included is of a similar type and configuration. An exemplary interface for entering payload weight data is shown in FIG. 7. After the payload weights are either entered or imported into the system, the user may click the "Calculate Payload" button, prompting the system to provide the statistical results, as shown.

Next, the payload weight data is analyzed based on the payload weight standard, as well as the target payload determined in step 330 (step 350). This analysis follows that which is described in detail with respect to FIG. 2B, and may include calculating the mean and standard deviation, calculating a series of percentages related to the payload weight data and the payload standard, rating the equipment based on the percentages, and/or calculating a modified target payload. A modified target payload may be calculated to provide a more accurate target payload for ensuring compliance. Because the payload weights may be considered as scattered in a normal distribution, it can be shown that over 99% of the loads fall within a range from minus three standard deviations to plus three standard deviations. A good estimate for target payload, then, is the maximum acceptable weight minus three standard deviations. This number simply provides an update to the target payload determined earlier in step 330.

FIG. 8 illustrates an exemplary interface providing results of the calculations and ratings performed in step 350. FIG. 9 illustrates an exemplary interface providing a modified target payload to the user.

Figure 10:
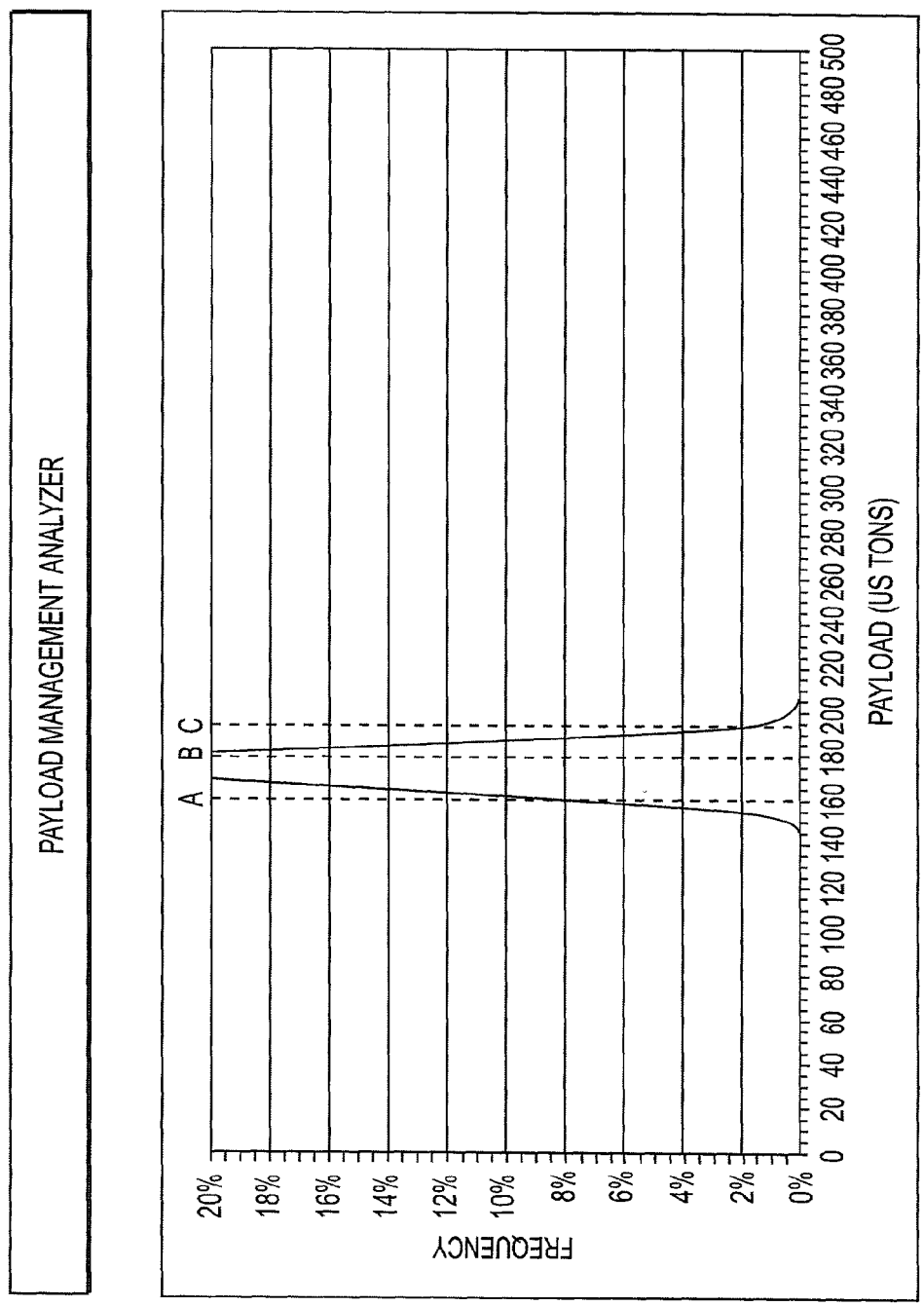
FIG. 10 is an exemplary output graph, consistent with the present invention.

Finally, the system may create a graphical representation of the analysis (step 360). FIG. 10 illustrates one exemplary graphical representation. The vertical dotted lines may indicate the target payload, the acceptable overload, and the maximum acceptable weight. The distribution of the payload weights with respect to these lines may be used to show an owner how the history of the equipment complies (or does not comply) with the standard in an easy to understand fashion. For example, in FIG. 10, line A represents the target payload; line B represents 10% over the target payload; and line C represents 20% over the target payload. Ideally, a piece of equipment's payloads should be centered around line A, with none exceeding line C.

INDUSTRIAL APPLICABILITY

Systems and methods consistent with the present invention provide a way to ensure compliance with a payload standard. This may assist a manufacturer or dealer in performing a warranty analysis, or may provide sufficient information to an equipment owner to help him obtain compliance or maintain compliance with respect to his equipment or to monitor equipment health and/or life expectancy. With respect to a manufacturer or dealer, when a piece of equipment is presented for routine maintenance (as is typically required of equipment of this type), the manufacturer can obtain the payload weight data from the piece of equipment for all payloads since the last maintenance and may archive the data for future use. When an owner brings a piece of equipment in for warranty repairs, the manufacturer may analyze the archived data and determine whether the piece of equipment has been operated according to the supplied payload weight standard. Along similar lines, the equipment owner may analyze the payload weight data to determine if he has been operating in compliance with the standard provided by his warranty. Because the system provides a modified target payload as well as a graphical representation, it is easy for the owner to understand how well the payloads have complied in the past, as well as how to comply in the future.

Further, systems and methods of the present invention may be used to monitor the payload management of a piece of equipment or fleet of pieces of equipment over time. For example, monthly analysis may indicate that an owner is continuing to increase the payload in his equipment, and is approaching a mark of non-compliance. By showing the owner this up-trend, the owner may be able to alter his behavior to ensure future compliance.

Finally, the system and method of the present invention may be used to flag certain pieces of equipment or fleets for additional or more frequent maintenance and reviews. For example, if the system determines that a piece of equipment is frequently operated at higher than the target payload, it may be called for maintenance more frequently than a piece of equipment that less frequently surpasses the target payload.

In addition to the payload standard provided by the manufacturer, the system may also be used by a manufacturer, dealer, or owner to determine if the operation of the piece of equipment falls within other imposed standards. Additionally, there may be instances where a contractual operating standard is imposed in addition to, or instead of, a typical manufacturer's warranty standard. This situation would also avail itself to use of the system of the present invention.

Thus, the present invention has wide application to monitor compliance with payload standards of all types. The system provides valuable information in a timely manner to both monitor compliance and allow adjustments where necessary to ensure future compliance. Other aspects and features of the present invention can be obtained from a study of the drawings, the disclosure, and the appended claims.

What is claimed is:

1. A non-transitory computer-readable medium storing instructions for performing a method, when executed by a processor, for analyzing compliance, of one or more pieces of equipment, with a payload standard for a calendar period of time that spans multiple different hauling events, the method comprising:
   determining a target payload for the one or more pieces of equipment during each of the multiple different hauling events that should result in compliance with the payload standard over the calendar period of time;
   recording payload weight data for the one or more pieces of equipment during each individual hauling event;
   determining a history of deviations of the recorded payload weight data from the target payload; and modifying the target payload for future hauling events based on the history of deviations such that an actual loading profile of the one or more pieces of equipment for the calendar period of time substantially complies with the payload standard;

wherein the payload standard includes an acceptable overload value and an unacceptable overload value, and determining a history of deviations includes:

determining a first percentage of the recorded payload weight data less than the acceptable overload value; and determining a second percentage of the recorded payload weight data greater than the unacceptable overload value.

2. The non-transitory computer-readable medium of claim 1, wherein the method further includes:

analyzing compliance with a first value of the payload standard based on the deviation determination; and analyzing compliance with a second value of the payload standard based on the deviation determination, wherein the first value of the payload standard does not equal the second value of the payload standard.

3. The non-transitory computer-readable medium of claim 1, wherein the target payload is determined based on at least one of the following features: slope of terrain or type of terrain.

4. The non-transitory computer-readable medium of claim 1, wherein the method further includes determining an empty machine weight for an equipment type, including:

obtaining an empty machine weight for two or more pieces of equipment of the equipment type; and calculating an average of the obtained empty machine weights.

5. The non-transitory computer-readable medium of claim 1, wherein the method further includes determining an empty machine weight for an equipment type, including:

obtaining an empty machine weight for two or more pieces of equipment that are members of a fleet;

calculating an average of the obtained empty machine weights; and applying the average as the determined empty machine weight for each piece of equipment in the fleet.

6. The non-transitory computer-readable medium of claim 1, wherein determining a target payload includes:

determining an empty machine weight for a type of the one or more pieces of equipment;

determining a maximum gross machine weight for the type of the one or more pieces of equipment; and subtracting the determined empty machine weight from the determined maximum gross machine weight.

7. The non-transitory computer-readable medium of claim 1, wherein determining a history of deviations includes:

calculating a mean payload value based on the recorded payload weight data;

calculating a standard deviation based on the recorded payload weight data; and determining a distribution of payloads based on the calculated mean payload value and the calculated standard deviation.

8. The non-transitory computer-readable medium of claim 1, wherein determining the second percentage includes:

choosing the lesser of the unacceptable overload value or a maximum gross machine weight as a maximum threshold; and determining the second percentage of the recorded payload weight data greater than the maximum threshold.

9. The non-transitory computer-readable medium of claim 1, further including:

providing a compliance rating for the one or more pieces of equipment based on the determined first and second percentages.

10. The non-transitory computer-readable medium of claim 1, wherein the method further includes:

providing a compliance rating for the one or more pieces of equipment based on the history of deviations.

11. The non-transitory computer-readable medium of claim 1, wherein the method further includes:

providing a compliance rating for the one or more pieces of equipment based on a set of one or more predetermined factors.

12. The non-transitory computer-readable medium of claim 1, wherein the method further includes:

displaying graphical results illustrating the results of the compliance analysis.

13. The non-transitory computer-readable medium of claim 1, wherein determining the history of deviations includes:

calculating a standard deviation of the recorded payload weight data;

multiplying the standard deviation of the recorded payload weight data by a predetermined factor to obtain an offset; and subtracting the offset from a maximum acceptable payload weight.

14. The non-transitory computer-readable medium of claim 1, wherein the method further includes:

determining equipment identification information about the one or more pieces of equipment.

15. The non-transitory computer-readable medium of claim 1, wherein the payload weight data includes:

a payload weight recorded for each individual hauling event; and a time duration of each individual hauling event.

16. The non-transitory computer-readable medium of claim 1, wherein the recorded payload weight data for a number of the multiple different hauling events is less than the target payload, and modifying the target payload includes increasing the target payload for future hauling events.

17. The non-transitory computer-readable medium of claim 1, wherein the payload standard is associated with a loading profile agreed-upon by a warrantor of the one or more pieces of equipment and a responsible party of the one or more pieces of equipment.

18. The non-transitory computer-readable medium of claim 17, wherein the loading profile includes factors corresponding to an operational time at a payload weight, and the payload weight.

19. The non-transitory computer-readable medium of claim 17, wherein the method further includes affecting a warranty of the one or more pieces of equipment based on compliance with the agreed-upon loading profile.

20. The non-transitory computer-readable medium of claim 1, wherein the target payload includes a payload weight that, when combined with a remaining amount of the calendar period of time of the one or more pieces of equipment loaded at the payload weight and with the history of deviations, results in compliance with the payload standard over the entire calendar period of time.

21. A system for analyzing compliance, of one or more pieces of equipment, with a payload standard for a calendar period of time that spans multiple different hauling events, the system comprising:

an input module configured to receive payload weight data about one or more pieces of equipment;

a processing module, connected to the input module, the processing module including a processor programmed to:

determine a target payload for the one or more pieces of equipment during each of the multiple different hauling events that should result in compliance with the payload standard over the calendar period of time;

record payload weight data for the one or more pieces of equipment during each individual hauling event;

determine a history of deviations of the recorded payload weight data from the target payload; and modify the target payload for future hauling events based on the history of deviations such that an actual loading profile of the one or more pieces of equipment for the calendar period of time substantially complies with the payload standard; and an output module, connected to the processing module, and configured to provide the modified target payload;

wherein the payload standard includes an acceptable overload value and an unacceptable overload value, and determining a history of deviations includes:

determining a first percentage of the recorded payload weight data less than the acceptable overload value; and determining a second percentage of the recorded payload weight data greater than the unacceptable overload value.

22. The system of claim 21, wherein the input module is connected to at least one of a network connection, a device for accessing stored data, or a data input device.

23. The system of claim 21, wherein the one or more pieces of equipment are connected to the input module by a network connection.

24. The system of claim 21, wherein the output module is connected to at least one of a monitor, a printer, a device to store data, or a device to send data over a network.

25. The system of claim 21, wherein the processing module further includes:
- a payload database;
- an equipment database; and
- wherein the payload database includes payload weight data from the one or more pieces of equipment and the equipment database contains data about the payload standard.

26. A non-transitory computer-readable medium storing instructions for performing a method, when executed by a processor, for reviewing a request for warranty service on a piece of equipment subject to a payload standard, the method comprising:

receiving a history of payload weight data associated with the piece of equipment;

analyzing the payload weight data for compliance with the payload standard; and based on the analysis, providing a modified target payload weight for the piece of equipment that differs from a historical target payload weight and that should ensure continued warranty coverage through a remainder of a calendar time duration of the payload standard;

wherein the payload standard includes an acceptable overload value and an unacceptable overload value, and determining a history of deviations includes:

determining a first percentage of the recorded payload weight data less than the acceptable overload value; and determining a second percentage of the recorded payload weight data greater than the unacceptable overload value.

27. The non-transitory computer-readable medium of claim 26, wherein analyzing the payload weight data further includes:

determining a first percentage of the payload weight data where each payload weight included in the first percentage is less than an acceptable overload value; and determining if the first percentage is less than a predetermined threshold value.

28. The non-transitory computer-readable medium of claim 26, further including responding to the request for warranty service based on the analysis.

29. A non-transitory computer-readable medium storing instructions for performing a method, when executed by a processor, for maintaining compliance with a payload standard for one or more pieces of equipment that spans a calendar time period corresponding to multiple different hauling events, where a first target payload is known for the one or more pieces of equipment and corresponds with compliance with the payload standard when achieved throughout the calendar time period, the method comprising:

obtaining payload weight data associated with one or more pieces of equipment for multiple different hauling events;

analyzing the payload weight data based on the payload standard and the first target payload;

generating as a result of the analysis, a second target payload based on the payload weight data, the second target payload being different from the first target payload and corresponding with compliance with the payload standard when achieved throughout a remainder of the calendar time period; and modifying loading practices for the one or more pieces of equipment based on the second target payload;

wherein the payload standard includes an acceptable overload value and an unacceptable overload value, and determining a history of deviations includes:

determining a first percentage of the recorded payload weight data less than the acceptable overload value; and determining a second percentage of the recorded payload weight data greater than the unacceptable overload value.

30. A computer system for reviewing a request for warranty service on a piece of equipment subject to a payload standard, the system comprising:

an input module of the computer system configured to receive payload weight data associated with the piece of equipment; and a processing module of the computer system connected to the input module, the processing module including a processor programmed to:

analyze the payload weight data for compliance with the payload standard; and based on the analysis, provide a modified target payload weight for the piece of equipment that differs from a historical target payload weight and that should ensure continued warranty coverage through a calendar time duration of the payload standard; and an output module of the computer system connected to the processing module and configured to provide the modified target payload weight;

wherein the payload standard includes an acceptable overload value and an unacceptable overload value, and determining a history of deviations includes:

determining a first percentage of the recorded payload weight data less than the acceptable overload value; and determining a second percentage of the recorded payload weight data greater than the unacceptable overload value.

31. The system of claim 30, wherein the processing module is further programmed to:

determine a first percentage of the payload weight data where each payload weight included in the first percentage is less than an acceptable overload value; and determine if the first percentage is less than a predetermined threshold value.

* * * * *